United States Patent
Broderick et al.

(10) Patent No.: US 7,384,244 B2
(45) Date of Patent: Jun. 10, 2008

(54) FATIGUE-RESISTANT COMPONENTS AND METHOD THEREFOR

(75) Inventors: Thomas Froats Broderick, Springboro, OH (US); Andrew P. Woodfield, Highland Heights, KY (US)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 11/014,611

(22) Filed: Dec. 16, 2004

(65) Prior Publication Data

US 2006/0133940 A1   Jun. 22, 2006

(51) Int. Cl.
*F01D 5/14* (2006.01)
(52) U.S. Cl. .................... 416/241 R; 416/1; 29/889.2
(58) Field of Classification Search .............. 416/1, 416/225, 241 R, 223 R, 224; 29/889, 889.2, 29/889.7, 889.71
See application file for complete search history.

(56) References Cited

U.S. PATENT DOCUMENTS

| 4,428,213 A | 1/1984 | Neal et al. |
| 5,591,009 A | 1/1997 | Mannava et al. |
| 5,620,307 A | 4/1997 | Mannava et al. |
| 5,666,841 A | 9/1997 | Seeger et al. |
| 5,826,453 A | 10/1998 | Prevey, III |
| 5,846,057 A | 12/1998 | Ferrigno et al. |
| 6,415,486 B1 | 7/2002 | Prevey, III |
| 6,672,838 B1 | 1/2004 | Crall et al. |
| 6,752,593 B2 * | 6/2004 | Clauer et al. ............... 415/200 |
| 6,893,225 B2 | 5/2005 | Crall et al. |
| 7,097,720 B2 * | 8/2006 | Mannava et al. ........... 148/565 |
| 2005/0158460 A1 * | 7/2005 | Williams .................... 427/140 |

FOREIGN PATENT DOCUMENTS

WO    WO 9525821 A1 *    9/1995

OTHER PUBLICATIONS

Prevey et al, Paul S., ; "Application of Low Plasticity Burnishing to Improve Damage Tolerance of a Ti-6A1-4V First Stage Fan Blade"; Proceedings of 44th AIAA/ASME/ASCE/AHS Structures, Structural Dynamics & Materials Conference, Norfolk, VA; Apr. 7-10, 2003.

* cited by examiner

*Primary Examiner*—Edward K. Look
*Assistant Examiner*—Dwayne J White
(74) *Attorney, Agent, or Firm*—Adams Intellectual Property Law, P.A.; William Scott Andes, Esq.

(57) ABSTRACT

A metallic component, which may be an airfoil, includes at least one treated patch, wherein the entire thickness of the component within the treated patch is in a state of residual compressive stress. A surface-treated area overlaps at least a boundary between the treated patch and the remainder of the component. The surface of the component within the surface-treated area is in a state of residual compressive stress, so as to resist crack initiation at the boundary between the treated patch and the remainder of the component. A method is also provided for making such a component.

11 Claims, 2 Drawing Sheets

FATIGUE-RESISTANT COMPONENTS AND METHOD THEREFOR

BACKGROUND OF THE INVENTION

This invention relates generally to metallic components and more particularly for a method of producing fatigue-resistant and damage-tolerant metallic components.

Various metallic components, such as gas turbine engine fan and compressor blades, are susceptible to cracking from fatigue and damage (e.g. from foreign object impacts). This damage reduces the life of the part, requiring repair or replacement.

It is known to protect metallic components from crack propagation by inducing residual compressive stresses therein. Methods of imparting this stress include shot peening, laser shock peening (LSP), pinch peening, and low plasticity burnishing (LPB). These methods are typically employed by applying a "patch" of residual compressive stresses over an area to be protected from crack propagation, for example a tip of a gas turbine engine compressor blade. While this process inhibits crack growth, it may leave the component subject to crack initiation at the boundary between the "patch" and the remainder of the component. This is an undesirable failure mode which may shorten the useful life of the component and/or increase the difficulty of repair.

Accordingly, there is a need for a method of protecting metallic components from crack propagation while promoting an acceptable failure mode thereof.

BRIEF SUMMARY OF THE INVENTION

The above-mentioned need is met by the present invention, which according to one aspect provides a metallic component, including at least one treated patch, wherein the entire thickness of the component within the treated patch is in a state of residual compressive stress. A surface-treated area overlaps at least a boundary between the treated patch and the remainder of the component. The surface of the component within the surface-treated area is in a state of residual compressive stress, so as to resist crack initiation at the boundary between the treated patch and the remainder of the component.

According to another aspect of the invention, a metallic airfoil for a gas turbine engine includes a root spaced apart from a tip, spaced-apart leading and trailing edges, a suction side extending from the leading edge to the trailing edge, and an opposed pressure side extending from the leading edge and the trailing edge, wherein a thickness of the airfoil is defined between the pressure side and the suction side. At least one treated patch is disposed on the airfoil, within which the entire thickness of the airfoil is under residual compressive stress. A surfaced-treated area is disposed on the airfoil, within which the surface of the airfoil is under residual compressive stress. The surface-treated area overlaps at least a boundary between the treated patch and the remainder of the airfoil.

According to another aspect of the invention, a method of reducing crack propagation in metallic components includes the steps of: providing a metallic component having an external surface, the component including at least one crack-prone area; creating at least one treated patch which covers the crack-prone area, wherein that the entire thickness of the component within the treated patch is left a state of residual compressive stress; and creating a surface-treated area on the external surface of the component which overlaps at least a boundary between the treated patch and the remainder of the component. Crack initiation at the boundary between the treated patch and the remainder of the component is thus resisted.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
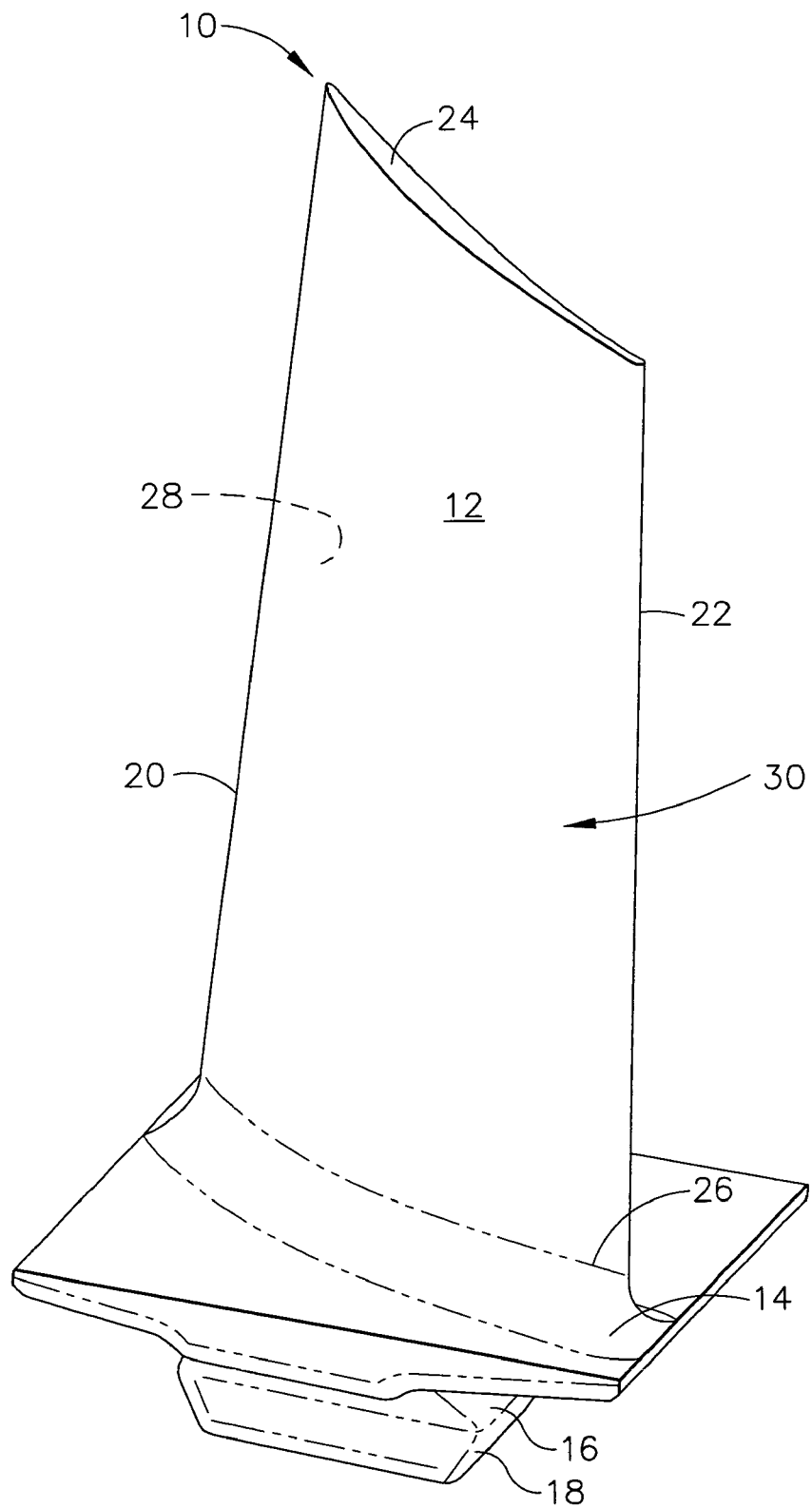
FIG. 1 is a schematic perspective view of a gas turbine engine compressor blade.

Referring to the drawings wherein identical reference numerals denote the same elements throughout the various views, FIG. 1 illustrates an exemplary gas turbine engine compressor blade 10. This component is used merely as an example, and the present invention is equally applicable to other types of metallic components susceptible to cracking from fatigue or damage, such as compressor stator vanes, fan blades, turbine blades, shafts and rotors, stationary frames, actuator hardware and the like. The compressor blade 10 comprises an airfoil 12, a platform 14, and a shank 16. In this particular example the shank 16 includes a dovetail 18 for being received in a slot of a rotating disk (not shown). The airfoil 12 has a leading edge 20, a trailing edge 22, a tip 24, a root 26, a convex suction side 28, and a concave pressure side 30.

Figure 2:
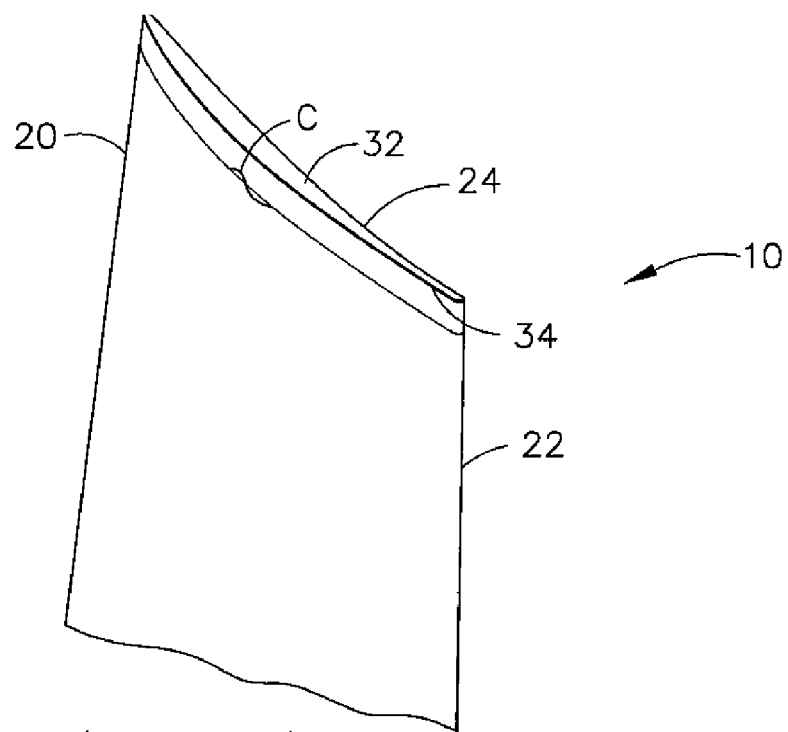
FIG. 2 is a side view of the compressor blade of FIG. 2.

FIG. 2 shows an enlarged portion of the compressor blade 10. The tip 24 of the compressor blade 10 is "crack-prone" or relatively more subject to crack initiation than the remainder of the compressor blade 10, for example because of fatigue or damage from foreign object impacts. This is also true of other areas including the leading edge 20 and the trailing edge 22. If the compressor blade 10 is left in service, the cracks will propagate further into the compressor blade 10, eventually rendering it unfit for further service or even causing component failure.

It is known to apply areas of residual compressive stress to these crack-prone areas to prevent or delay cracking. In the prior art, "patches" of residual compressive stress are applied to vulnerable areas such as the above-mentioned tip 24, for example the patch 32 shown applied across the tip 24. However, these surface area patches applied at the edge of a component cannot totally eliminate cracking. When cracking does occur, it may initiate at the boundary of the patch 34 and the remainder of the airfoil 12, as shown by the representative crack "C" in FIG. 2. This is undesirable because it may encourage failure or separation of the tip 24 from the compressor blade 10 and results in a damage pattern which is more difficult to repair than if the cracks initiated at the tip 24.

Figure 3:
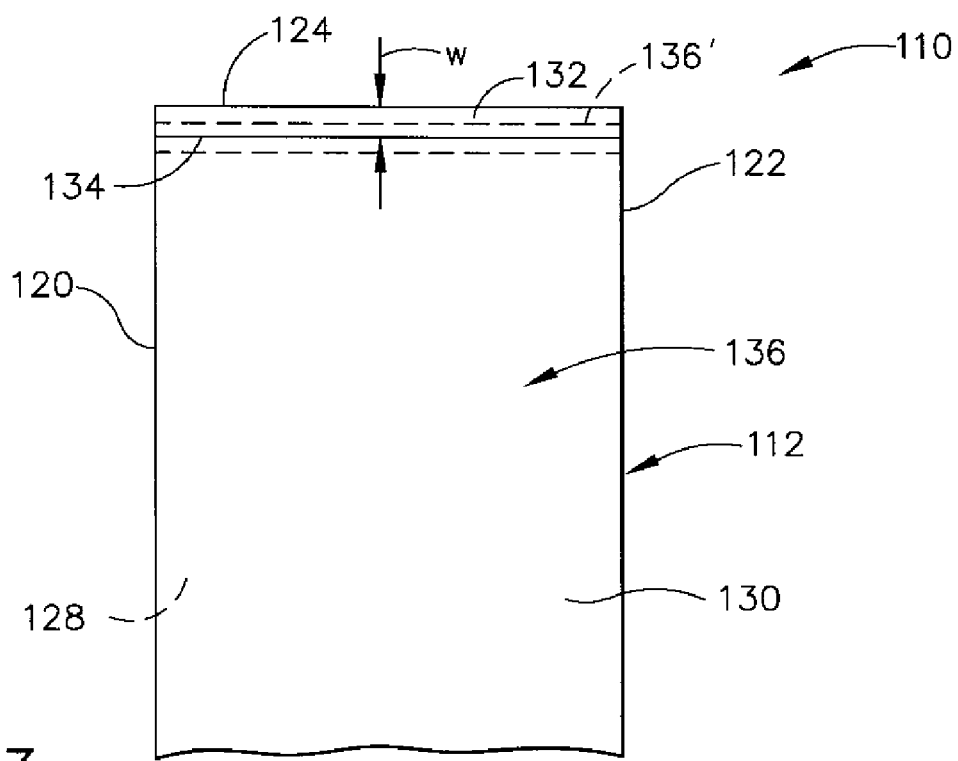
FIG. 3 is a side view of another compressor blade treated in accordance with the method of the present invention.

FIG. 3 shows a portion of a compressor blade 110 which has been treated in accordance with the present invention. The compressor blade 110 is substantially similar in construction to the compressor blade 10 and includes an airfoil 112 with a leading edge 120, trailing edge 122, tip 124, suction side 128, and pressure side 130. The compressor blade 110 incorporates a treated patch 132 at the tip 124. Within the treated patch 132, the material of the compressor blade 110 is in a condition of residual compressive stress throughout its thickness. The treated patch 132 extends in a direction generally parallel to the tip 124 from the leading edge 120 to the trailing edge 122, and has a width "W". The width W will vary with the particular application, but is generally selected to be wide enough to substantially reduce or prevent crack propagation, while minimizing the surface area of the treated patch 132. In the illustrated example, the width W maybe from about 1.6 mm (0.063 in.) to about 3.2 mm (0.125 in.). Additional treated patches (not shown) similar to treated patch 132 maybe applied to other areas of the compressor blade 110 to further reduce crack propagation.

At least part of the surface of the airfoil 112 also includes a surface-treated area 136. This closes any surface microcracks and leaves the external surface of the airfoil 112 in a state of residual compressive stress. The surface-treated area 136 overlaps at least the boundary 134 between the treated patch 132 and the remainder of the airfoil 112, in order to avoid a sharp transition in material properties at the boundary 134. In the illustrated example, the surface-treated area 136 covers substantially all of the pressure and suction sides 130 and 128, respectively, of the airfoil 112. However, a smaller surface-treated area could be used, depicted as 136' in FIG. 3.

The treated patch 132 may be applied by a number of methods. Examples of known suitable methods include laser shock peening (LSP), pinch peening, shot peening, and low plasticity burnishing (LPB). One preferred method is low plasticity burnishing, in which a normal force is applied to the compressor blade 110 using a stylus of a known type (not shown). The stylus is translated along the surface of the compressor blade 110 to form the intended treated patch 132. The amount of cold-working applied to the compressor blade 110 during this process is of relatively little concern given the anticipated operating conditions. After the treated patch 132 is created, a peening process such as glass bead peening is applied to the surface of the airfoil 112, to create the surface-treated area 136, using peening equipment of a known type.

In operation, the compressor blade 110 will be subjected to fatigue and damage that tends to cause cracking. The cracks initiate in "crack-prone" areas such as the tip 124. Unchecked, these cracks would grow and extend further into the compressor blade 110, until eventually the compressor blade failed in service or could not be economically repaired. However, the treated patch 132 as described above resists crack initiation and tends to slow crack propagation. Furthermore, with the peening treatment, any cracks which do appear will initiate at the tip 124 of the compressor blade 10 and not at the boundary 134 between the treated patch 132 and the remainder of the compressor blade 110. This combination of treatments thus both resists cracking and ensures that the cracking failure mode will be acceptable.

The foregoing has described fatigue- and damage-resistant components and methods for making such components. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A metallic component, comprising:
   at least one treated patch, wherein a majority of the thickness of said component within said treated patch is in a state of residual compressive stress applied by a low plasticity burnishing process; and
   a surface-treated area, said surface-treated area overlapping at least a boundary between said treated patch and the remainder of said component, wherein the surface of said component within said surface-treated area is in a state of residual compressive stress applied by a mechanical peening process, so as to resist crack initiation at said boundary between said treated patch and the remainder of said component.

2. The metallic component of claim 1 wherein said component is bounded by at least one peripheral edge, and said treated patch is disposed adjacent to said peripheral edge.

3. The metallic component of claim 1 wherein said surface-treated area covers substantially all of the external surface of said component.

4. A metallic airfoil for a gas turbine engine, comprising:
   a root spaced apart from a tip, spaced-apart leading and trailing edges, a suction side extending from said leading edge to said trailing edge, and an opposed pressure side extending from said leading edge and said trailing edge, wherein a thickness of said airfoil is defined between said pressure side and said suction side;
   at least one treated patch, within which substantially the entire thickness of said airfoil is under residual compressive stress applied by a low plasticity burnishing process; and
   a surfaced-treated area within which the surface of said airfoil is under residual compressive stress applied by a mechanical peening process, said surface-treated area overlapping at least a boundary between said treated patch and the remainder of said airfoil.

5. The metallic airfoil of claim 4 wherein said treated patch is disposed adjacent to a selected one of said leading edge, said trailing edge, or said tip, such that said treated patch is adapted to resist the growth of cracks propagating from said selected leading edge, said trailing edge, or said tip, respectively.

6. The metallic airfoil of claim 5 wherein said surface-treated area covers substantially all of said pressure side and said suction side.

7. The metallic airfoil of claim 4 wherein said treated patch is disposed adjacent said tip.

8. A method of reducing crack propagation in metallic components, comprising:
   providing a metallic component having an external surface, said component including at least one crack-prone area and defining a thickness;
   creating at least one treated patch which covers said crack-prone area, wherein a majority of the thickness of said component within said treated patch is left a state of residual compressive stress applied by a low plasticity burnishing process; and
   creating a surface-treated area on said external surface of said component which overlaps at least a boundary between said treated patch and the remainder of said component; whereby crack initiation at the boundary between said treated patch and the remainder of said component is resisted by residual compressive stresses on said external surface produced by applying a mechanical peening process to said surface-treated area.

9. The method of claim 8 wherein said step of creating a surface-treated area comprises applying glass-bead peening to a selected portion of said external surface.

10. The method of claim 8 wherein said component is bounded by at least one peripheral edge, and said crack-prone area is disposed adjacent said peripheral edge.

11. The method of claim 8 wherein said surface-treated area covers substantially all of said external surface of said component.

* * * * *

(12) EX PARTE REEXAMINATION CERTIFICATE (8845th)
United States Patent
Broderick et al.

(10) Number: US 7,384,244 C1
(45) Certificate Issued: Feb. 7, 2012

(54) FATIGUE-RESISTANT COMPONENTS AND METHOD THEREFOR

(75) Inventors: Thomas Froats Broderick, Springboro, OH (US); Andrew P. Woodfield, Highland Heights, KY (US)

(73) Assignee: General Electric Company, Schenectady, NY (US)

Reexamination Request:
No. 90/009,815, Aug. 30, 2010

Reexamination Certificate for:
Patent No.: 7,384,244
Issued: Jun. 10, 2008
Appl. No.: 11/014,611
Filed: Dec. 16, 2004

(51) Int. Cl.
*F01D 5/14* (2006.01)

(52) U.S. Cl. .................. 416/241 R; 416/1; 29/889.2

(58) Field of Classification Search .................. None
See application file for complete search history.

(56) References Cited

To view the complete listing of prior art documents cited during the proceeding for Reexamination Control Number 90/009,815, please refer to the USPTO's public Patent Application Information Retrieval (PAIR) system under the Display References tab.

*Primary Examiner* — William Doerrler

(57) ABSTRACT

A metallic component, which may be an airfoil, includes at least one treated patch, wherein the entire thickness of the component within the treated patch is in a state of residual compressive stress. A surface-treated area overlaps at least a boundary between the treated patch and the remainder of the component. The surface of the component within the surface-treated area is in a state of residual compressive stress, so as to resist crack initiation at the boundary between the treated patch and the remainder of the component. A method is also provided for making such a component.

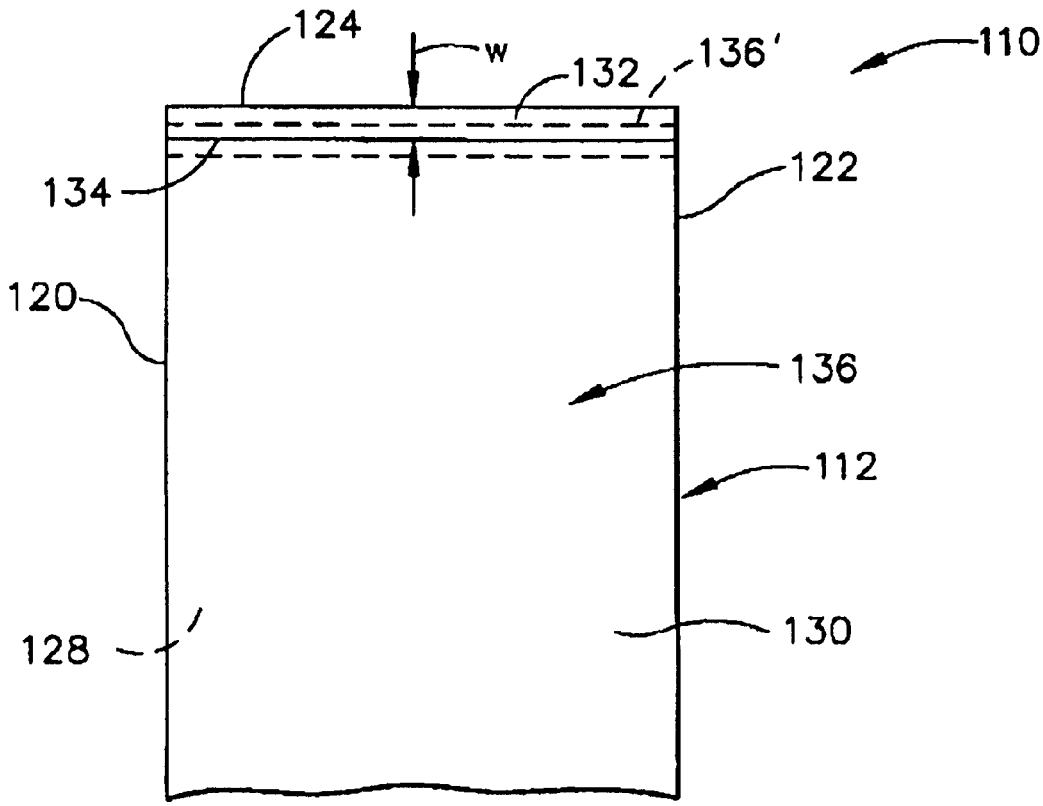

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-11 are cancelled.

* * * * *